(12) United States Patent
Chatani

(10) Patent No.: US 11,850,748 B2
(45) Date of Patent: Dec. 26, 2023

(54) PICKING ROBOT, PICKING METHOD, AND COMPUTER PROGRAM PRODUCT

(71) Applicant: KABUSHIKI KAISHA TOSHIBA, Tokyo (JP)

(72) Inventor: Harutoshi Chatani, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 299 days.

(21) Appl. No.: 17/004,420

(22) Filed: Aug. 27, 2020

(65) Prior Publication Data

US 2021/0170588 A1  Jun. 10, 2021

(30) Foreign Application Priority Data

Dec. 10, 2019   (JP) .................................. 2019-222876

(51) Int. Cl.
 *B25J 9/16*    (2006.01)
 *B25J 15/00*   (2006.01)

(52) U.S. Cl.
 CPC .......... *B25J 9/1612* (2013.01); *B25J 9/1664* (2013.01); *B25J 9/1697* (2013.01); *B25J 15/00* (2013.01)

(58) Field of Classification Search
 CPC .......... B25J 15/00; G05B 2219/39479; G05B 2219/39508; G05B 2219/40584; G05B 2219/40607; G05B 2219/45063
 See application file for complete search history.

(56) References Cited

U.S. PATENT DOCUMENTS

| 5,325,468 A | * | 6/1994 | Terasaki | B25J 9/1669 |
| | | | | 700/262 |
| 2011/0222995 A1 | * | 9/2011 | Irie | B25J 9/1697 |
| | | | | 700/218 |
| 2013/0085604 A1 | | 4/2013 | Irie et al. | |
| 2021/0129318 A1 | * | 5/2021 | Namiki | G06T 1/0007 |
| 2021/0129319 A1 | * | 5/2021 | Kaneko | G06N 3/084 |

FOREIGN PATENT DOCUMENTS

| JP | 2013078825 A | 5/2013 |
| JP | 2014050936 A | 3/2014 |
| JP | 2017064817 A | 4/2017 |

* cited by examiner

*Primary Examiner* — Abby Y Lin
*Assistant Examiner* — Dylan Brandon Mooney
(74) *Attorney, Agent, or Firm* — Holtz, Holtz & Volek PC

(57) ABSTRACT

A picking robot of an embodiment includes an acquisition unit, first and second calculation units, a control unit, and a grip unit. The acquisition unit acquires first area information. The first calculation unit calculates first position/posture information indicating a position/posture of a target object from the first area information. The second calculation unit calculates second position/posture information differing from the first position/posture information. The control unit grips the target object, based on the first position/posture information, controls a first operation of moving the target object to a second area. When a first operation result is inadequate, the control unit controls a second operation of arranging the target object at a position indicated by the second position/posture information in a posture indicated by the second position/posture information. The grip unit grips the target object and moves the gripped target object, based on the control by the control unit.

11 Claims, 8 Drawing Sheets

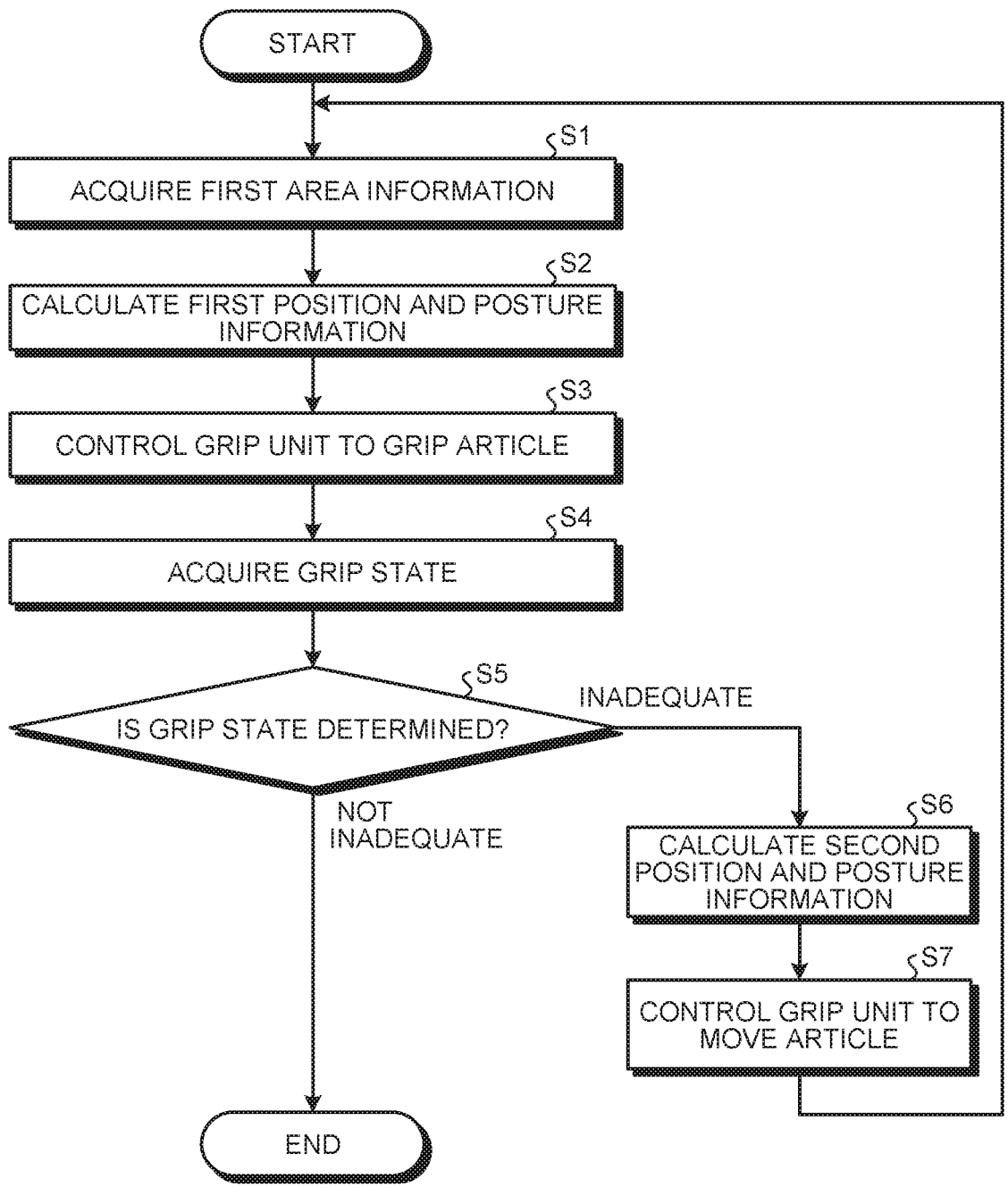

PICKING ROBOT, PICKING METHOD, AND COMPUTER PROGRAM PRODUCT

CROSS-REFERENCE TO RELATED APPLICATIONS

This application is based upon and claims the benefit of priority from Japanese Patent Application No. 2019-222876, filed on Dec. 10, 2019; the entire contents of which are incorporated herein by reference.

FIELD

Embodiments described herein relate generally to a picking robot, a picking method, and a computer program product.

BACKGROUND

In a picking system that acquires position and posture information about articles from a sensor and causes a picking robot to perform picking, gripping may not be performed as intended and incorrect picking may be performed, depending on the accuracy of the sensor or the arrangement of the articles. For such cases, detection and automatic recovery of the false picking is required for continuing the operation of the system.

However, in conventional technologies, even when an inadequacy occurred in a picking process, it has been difficult to recover the picking process to a regular state without forcibly stopping a picking robot. For example, there is a possible case where, when the picked article is mistakenly returned to its original container, the article is mistakenly re-picked depending on how the article is returned. As a result, the picking and the returning are repeated many times and forcible stopping of the picking robot is necessary.

BRIEF DESCRIPTION OF THE DRAWINGS

FIG. 7 is a flowchart illustrating an example of a picking method according to an embodiment.

DETAILED DESCRIPTION

A picking robot of an embodiment includes an acquisition unit, a first calculation unit, a second calculation unit, a control unit, and a grip unit. The acquisition unit acquires first area information. The first calculation unit calculates first position and posture information indicating a position and posture of a target object from the first area information. The second calculation unit calculates second position and posture information that is different from the first position and posture information. The control unit grips the target object based on the first position and posture information, controls a first operation of moving the target object to a second area. When a result of the first operation is inadequate, control unit controls a second operation of arranging the target object at a position indicated by the second position and posture information in a posture indicated by the second position and posture information. The grip unit grips the target object and moves the gripped target object, based on the control by the control unit.

Hereinafter, embodiments of a picking robot, a picking method, and a program will be described in detail with reference to the accompanying drawings.

Figure 1:
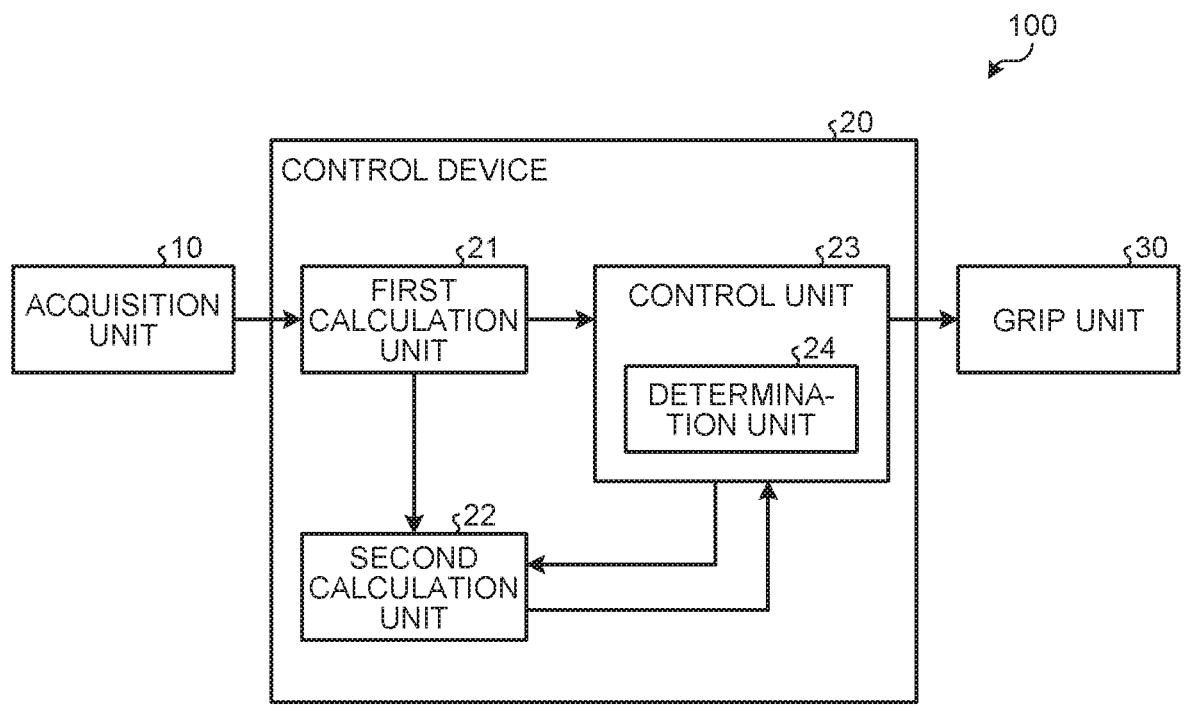
FIG. 1 is a diagram illustrating an example of a functional configuration of a picking robot according to an embodiment.
Figure 2:
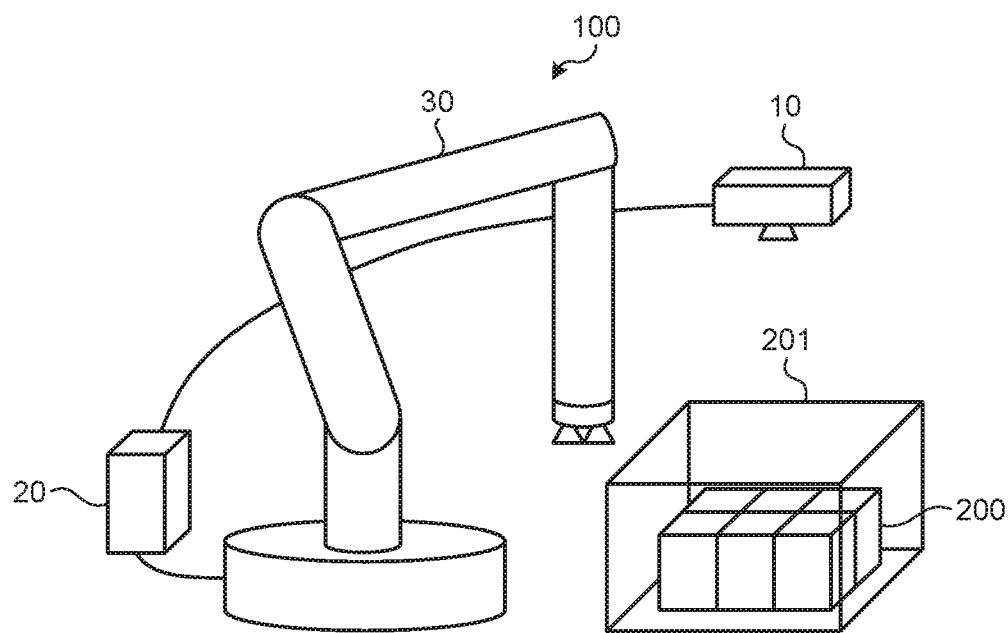
FIG. 2 is a diagram illustrating an example of the external appearance of the picking robot according to an embodiment.

FIG. 1 is a diagram illustrating an example of a functional configuration of a picking robot 100 according to an embodiment. Also, FIG. 2 is a diagram illustrating an example of the external appearance of the picking robot 100 according to an embodiment. The picking robot 100 according to the embodiment includes an acquisition unit 10, a control device 20, and a grip unit 30.

First, the acquisition unit 10 will be described.

The acquisition unit 10 acquires first area information indicating a first area 201 in which a target object (for example, an article 200) is placed. Specifically, the acquisition unit 10, for example, captures an image of the article 200, acquires the captured image, such as a still image or a moving image, as first area information, and inputs the captured image to the control device 20. The article 200 is a target object gripped by the grip unit 30 and is a box in the present embodiment. It should be noted that the shape of the article 200 is not limited to the box and may be objects of various shapes.

The installation place of the acquisition unit 10 is not limited to the upper portion of the first area 201 (for example, a fixed position such as a wall or a ceiling) as illustrated in FIG. 2. The acquisition unit 10 may be attached to a part of the grip unit 30, for example, a hand tip of the grip unit 30 as long as the first area 201 can be captured.

The acquisition unit 10 is realized by a sensor, for example, a depth camera, an LRF, a 3D-LiDAR, or a stereo camera, which can acquire information on a distance from the article 200. An image capturing request to the acquisition unit 10 may be released by, for example, the control device 20 at an arbitrary timing based on the state of the grip unit 30. Further, for example, the image capturing request to the acquisition unit 10 may be made by a higher-level system that manages the entire system. Further, for example, the image capturing request to the acquisition unit 10 may be automatically executed on a regular basis.

Next, the control device 20 will be described.

The control device 20 includes a first calculation unit 21, a second calculation unit 22 and a control unit 23. The control unit 23 includes a determination unit 24.

The first calculation unit 21 calculates first position and posture information indicating the position and posture of the article 200 from the above-described first area information.

The second calculation unit 22 calculates second position and posture information that is different from the first position and posture information. The position indicated by the second position and posture information may be different from the position indicated by the first position and posture information, the posture indicated by the second position and posture information may be different from the posture indicated by the first position and posture information, and both may be different from each other. A more detailed description of the second position and posture information will be described below with reference to FIGS. 4A and 4B.

The control unit 23 transmits control information to a device that controls the operation of each movable portion of the grip unit 30 based on the calculated first position and posture information, and controls the operation of the grip unit 30 with respect to the article 200. It should be noted that the device that controls the operation of each movable portion of the grip unit 30 may be built in the grip unit 30 or may be an external device (for example, a personal computer, or the like). Further, the control unit 23 may directly control the operation of each movable portion of the grip unit 30 based on the control information.

Specifically, the control unit 23 grips the article 200 based on the first position and posture information, controls a first operation of moving the article 200 to a second area, and when the result of the first operation is inadequate (not adequate), controls a second operation of arranging the article 200 at the position indicated by the second position and posture information in the posture indicated by the second position and posture information.

The determination unit 24 determines whether the result of the first operation is inadequate, for example, based on the grip state of the article 200 gripped by the first operation. Details of the processing of the determination unit 24 will be described below with reference to FIGS. 6A and 6B.

The grip unit 30 grips the article 200 and moves the gripped article 200 based on the control by the control unit 23.

The grip unit 30 includes a mechanism, such as adsorption or clamping, which grips the article 200. Hereinafter, the tip of the gripping mechanism in the grip unit 30 will be referred to as a hand tip. The grip unit 30 can freely move the gripping mechanism to an arbitrary position and posture. It should be noted that FIG. 2 schematically illustrates its function and is a 6-axis vertical articulated robot having a mechanism that grips an object by adsorption.

It should be noted that the grip unit 30 is not limited to the robot having a 6-axis degree of freedom, and the grip unit 30 may be a robot having a 7-axis degree of freedom or may be a SCARA robot or an orthogonal robot.

The first area 201 on which the article 200 is loaded is provided within the movable range of the hand tip of the grip unit 30. It should be noted that the first area 201 is not limited to the bin container as illustrated in FIG. 2 and may be a top surface of a desk or a conveyor or may be a cart or the like.

Here, the position and posture of the article 200 are indicated by position data and posture data represented using a certain coordinate system.

Figure 3:
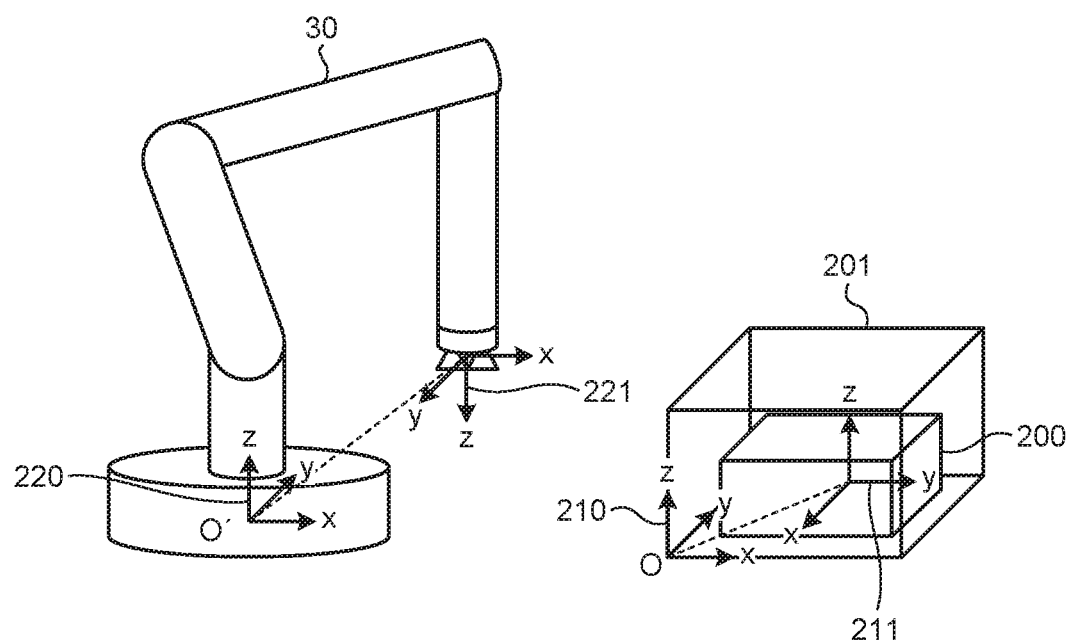
FIG. 3 is a diagram illustrating an example of a coordinate system representing position and posture according to an embodiment.

FIG. 3 is a diagram illustrating an example of a coordinate system representing position and posture according to an embodiment. The position and posture of the article 200 are represented by, for example, the translation and rotation of an article coordinate system 211 from a basing point O in a bin coordinate system 210.

The origin of the article coordinate system 211 can be, for example, the center of gravity of the article 200, but the origin of the article coordinate system 211 may be determined by other methods. The bin coordinate system 210 and the article coordinate system 211 may be set in any manner as long as the orientation or the location of the article 200 can be uniquely determined.

Further, for example, as illustrated in FIG. 3, the position and posture of the grip unit 30 are represented by the translation and rotation of a hand tip coordinate system 221 (for example, the center of the hand is the origin of the hand tip coordinate system 221) from a basing point O' of a robot coordinate system 220 of the grip unit 30. The position and posture of the article 200 and the position and posture of the grip unit 30 have one-to-one correspondence by coordinate conversion. In FIG. 3, the basing point O' is set near the foot of the grip unit 30, but other locations are usable as long as the position of the hand tip of the grip unit 30 is uniquely determinable.

Next, details of the first calculation unit 21 and the second calculation unit 22 will be described.

The first calculation unit 21 detects the position and posture of the article 200 or the position and posture of the surface of the article 200 based on the first area information acquired by the acquisition unit 10, and calculates the position and posture for the grip unit 30 to grip the article 200. As the method for calculating the position and posture of the article 200, any object detection methods can be used. Further, a method for detecting a shape that can be adsorbed (such as a plane) without directly detecting the article 200 may be used. Further, the position and posture of the grip unit 30 that grips the article 200 are preferably the position and posture that enable the article 200 to be stably gripped, such as the center of gravity of the plane that grips the article 200.

The second calculation unit 22 calculates the second position and posture information that is different from the first position and posture information calculated by the first calculation unit 21, based on the determination result of the determination unit 24, and calculates the position and posture when the grip unit 30 arranges the article 200, based on the second position and posture information.

Here, the first position and posture information and the second position and posture information will be described.

Figure 4A:
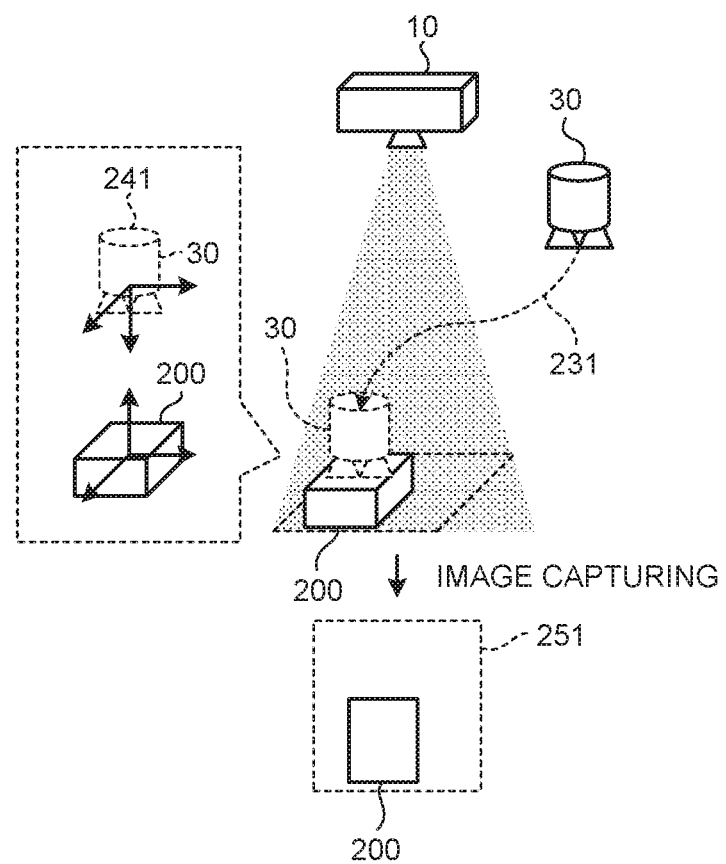
FIG. 4A is a diagram illustrating an example of first position and posture information according to an embodiment.
Figure 4B:
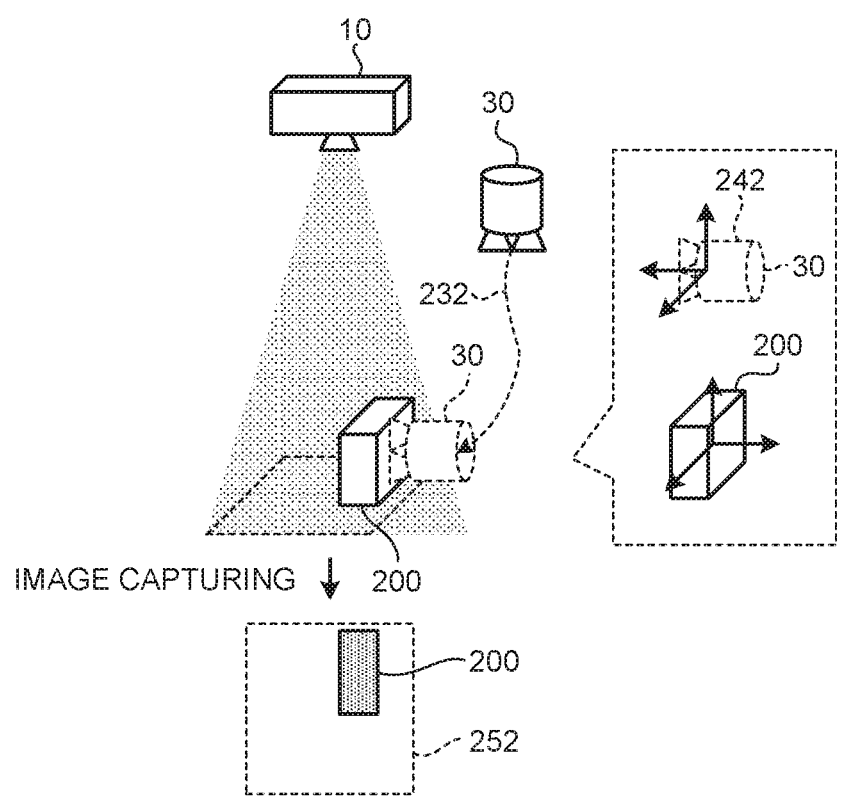
FIG. 4B is a diagram illustrating an example of second position and posture information according to an embodiment.

FIG. 4A is a diagram illustrating an example of the first position and posture information according to an embodiment. FIG. 4B is a diagram illustrating an example of the second position and posture information according to an embodiment.

The second position and posture information indicates the position and posture of the article 200 when the grip unit 30 grips the article 200 again and arranges the article 200 such that a third operation of moving the article 200 to the second area is different from the first operation described above.

Specifically, for example, as illustrated in FIGS. 4A and 4B, the second position and posture information indicates the position and posture of the article 200 such that a trajectory 231 of the grip unit 30 (trajectory according to the first operation) when the article 200 is initially gripped is different from a trajectory 232 of the grip unit 30 (trajectory according to the third operation) when the article 200 is gripped again after the operation (second operation) of returning the article 200.

Further, for example, the second position and posture information indicates the position and posture of the article 200 when the article 200 is arranged such that the position and posture 242 of the grip unit 30 at the point of gripping the article 200 in the third operation is different from the position and posture 241 of the grip unit 30 at the point of gripping the article 200 in the first operation.

Further, for example, the second position and posture information indicates the position and posture of the article 200 when the article 200 is arranged such that a second image 252 of a target object arranged based on the second position and posture information is different from a first image 251.

Further, the following criteria are preferable as the calculation criterion of the second position and posture information.

Figure 5A:
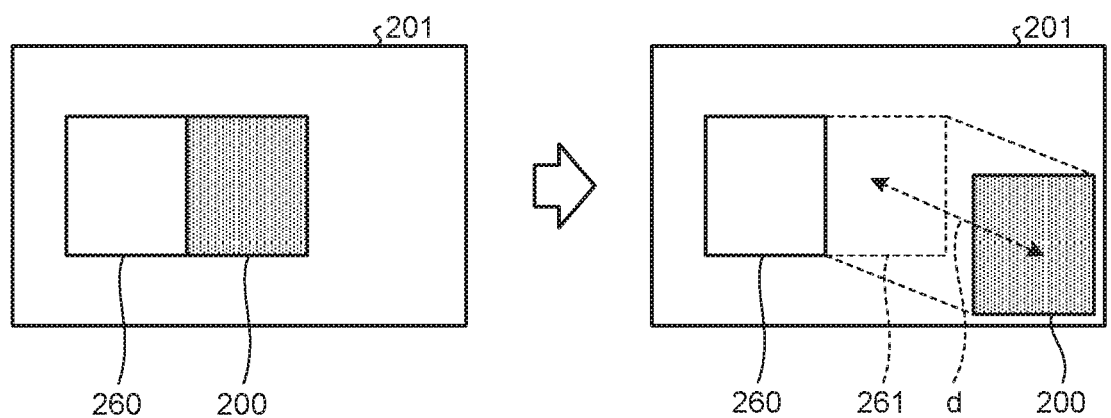
FIG. 5A is a diagram illustrating a first example of a calculation criterion of second position and posture information according to an embodiment.

FIG. 5A is a diagram illustrating a first example of the calculation criterion of the second position and posture information according to an embodiment. In the example of FIG. 5A, a case in which an obstacle 260 is located next to the article 200 to be gripped is illustrated. Further, when the first area 201 is a container or the like, the side surface of the container also becomes an obstacle.

For example, the position indicated by the second position and posture information calculated by the second calculation unit 22 is a position farther from the position indicated by the first position and posture information. Specifically, for example, as illustrated in FIG. 5A, the calculation criterion of the second position and posture information is a position at which a distance d is the farthest from a grip position 261. It should be noted that the range of the distance d is not limited to the first area 201, and when there are different areas such as temporary storage places, the range of the distance d may include the different areas.

Figure 5B:
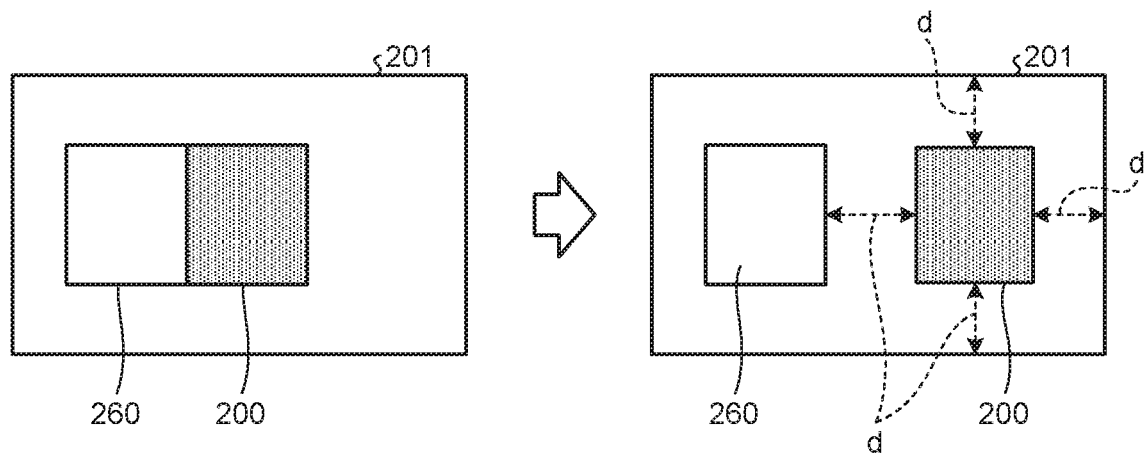
FIG. 5B is a diagram illustrating a second example of a calculation criterion of second position and posture information according to an embodiment.

FIG. 5B is a diagram illustrating a second example of the calculation criterion of the second position and posture information according to an embodiment. For example, the position indicated by the second position and posture information calculated by the second calculation unit 22 indicates the position at which the distance d between the article 200 and the obstacle (the obstacle 260 and the side surface of the first area 201) is greater. Specifically, for example, as illustrated in FIG. 5B, the calculation criterion of the second position and posture information is a position at which the minimum distance between the article 200 to be gripped and the obstacle in the horizontal plane is maximum.

As the calculation criterion of the second position and posture information, a method other than those illustrated in FIGS. 5A and 5B may be used as long as such an arrangement of the article 200 is realizable as that false picking of re-picking a plurality of the articles 200 or unfeasibility of arranging the article 200 does not occur after returning the article 200.

Next, details of the processing of the determination unit 24 will be described.

The determination unit 24 determines whether the result of the above-described first operation is inadequate, for example, based on the grip state after the article 200 is gripped. Specifically, the determination unit 24 determines whether information such as the number of gripped articles 200 matches information specified by the grip request. Further, for example, the determination unit 24 determines whether the gripped article 200 is appropriately arranged in a movement destination (second area).

The determination of the determination unit 24 may be performed when the article 200 is gripped, and may be performed at any timing between the time when the article 200 is gripped and the time when the article 200 is arranged in the second area.

Figure 6A:
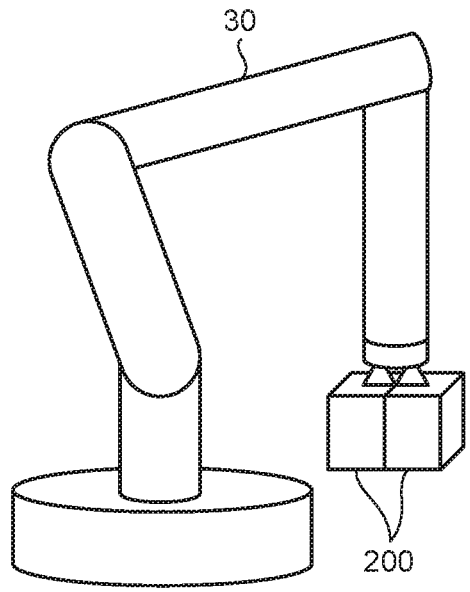
FIG. 6A is a diagram illustrating a first example of inadequacy determination according to an embodiment.

FIG. 6A is a diagram illustrating a first example of inadequacy determination according to an embodiment. For example, as illustrated in FIG. 6A, the determination unit 24 detects a plurality of the gripping target article 200 by using a sensor to recognize the grip unit 30 that is in the state of gripping the article 200 and performing comparison with size information of the article 200. Accordingly, the determination unit 24 can determine as inadequacy when the number of gripped articles 200 is greater than or equal to the number (for example, one) designated by the grip request.

Figure 6B:
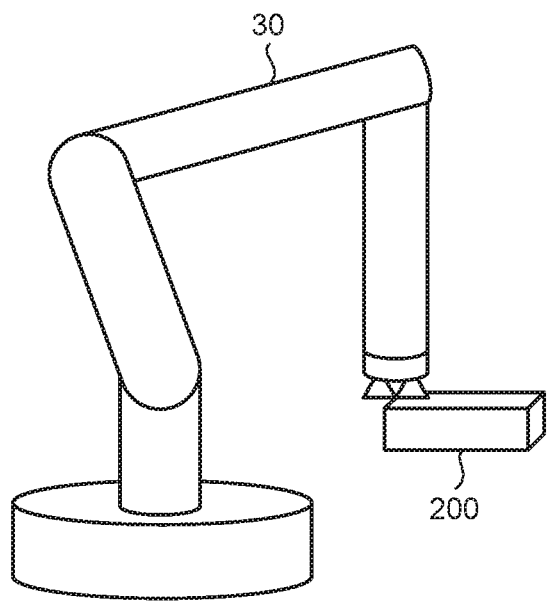
FIG. 6B is a diagram illustrating a second example of inadequacy determination according to an embodiment.

FIG. 6B is a diagram illustrating a second example of inadequacy determination according to an embodiment. For example, as illustrated in FIG. 6B, the determination unit 24 determines as an inadequacy even when the article 200 cannot be correctly arranged, from the relative positional relationship between the grip unit 30 and the article 200, for example, for reasons such as interference with the wall surface of the container (second area) at the place to be moved.

It should be noted that the method for detecting the grip state is not limited to the recognition performed by the sensor. For example, when the grip unit 30 includes a weight sensor, the number of gripped articles may be detected from weight information about the article 200.

FIG. 7 is a flowchart illustrating an example of a picking method according to an embodiment. First, the acquisition unit 10 acquires first area information such as a captured image and inputs the first area information to the first calculation unit 21 (step S1). Next, the first calculation unit 21 calculates the position and posture of the article 200 (the position and posture of the gripped portion of the article 200) gripped by the grip unit 30, and inputs the calculated position and posture of the article 200 as the first position and posture information to the control unit 23 (step S2).

Next, the control unit 23 generates control information including trajectory information for the grip unit 30 to move based on the position and posture of the gripped portion of the article 200, and when the control information is input to the grip unit 30, the grip unit 30 grips the article 200 (step S3). The acquisition unit 10 acquires a grip state of the article 200 (Step S4). Then, the determination unit 24 determines whether the grip state is adequate or inadequate, based on the grip state after the article 200 is gripped (step S5).

When the grip state is adequate (step S5, Yes), the picking robot 100 performs a regular picking process without transitioning to a recovery process and ends the picking process.

When the grip state is inadequate (step S5, No), the picking robot 100 transitions to the recovery process. Specifically, the second calculation unit 22 calculates second position and posture information that is different from the first position and posture information, and inputs the second position and posture information to the control unit 23 (step S6). Next, the control unit 23 generates control information including trajectory information for the grip unit 30 to move based on the second position and posture information, and when the control information is input to the grip unit 30, the grip unit 30 grips and moves the article 200 (step S7). Due to the process of step S7, the article 200 is rearranged as illustrated in, for example, FIGS. 5A and 5B described above. When the process of step S7 ends, the process returns to step S1.

As described above, in the picking robot 100 of the embodiment, the acquisition unit 10 acquires first area information indicating the first area 201 in which the article 200 (target object) is placed. The first calculation unit 21 calculates first position and posture information indicating the position and posture of the target object from the first area information. The second calculation unit 22 calculates second position and posture information that is different from the first position and posture information. The control unit 23 grips the target object based on the first position and posture information, controls the first operation of moving the target object to the second area, and when the result of the first operation is inadequate, controls the second operation of arranging the target object at the position indicated by the second position and posture information in the posture indicated by the second position and posture information. Therefore, the grip unit 30 grips the target object and moves the gripped target object, based on the control by the control unit 23.

Therefore, according to the picking robot 100 of the embodiment, even when an inadequacy occurs in the picking process, the picking process is recoverable to an adequate state without forcibly stopping the picking robot 100. For example, according to the picking robot 100 of the embodiment, even when unintended-quantity articles 200 are simultaneously gripped, the articles 200 can be arranged such that the intended-quantity articles 200 can be gripped when the articles 200 are gripped again. Further, for example, according to the picking robot 100 of the embodiment, in the case where inadequate gripping (wrong picking) is performed in an un-releasable posture, the article 200 can be returned by gripping the article 200 again in such a manner that inadequate gripping for releasing does not occur.

Finally, an exemplary configuration of the hardware (computer) that controls the picking robot 100 of the embodiment will be described.

[Exemplary Hardware Configuration]

Figure 8:
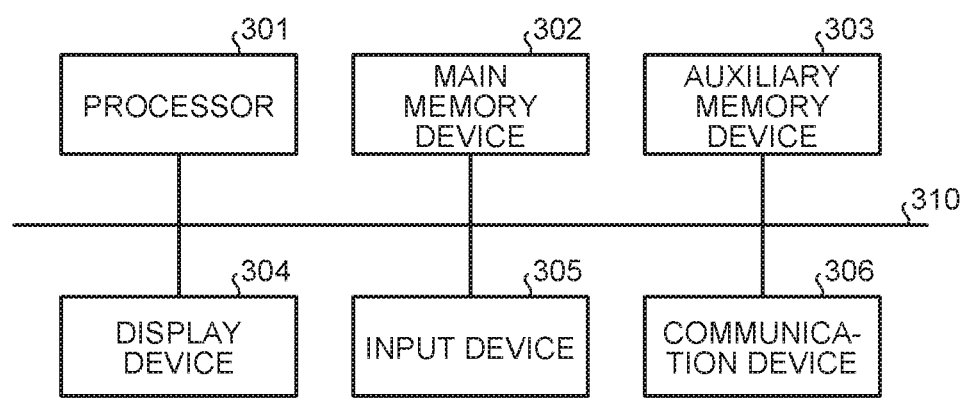
FIG. 8 is a diagram illustrating an exemplary configuration of hardware that controls a picking robot according to an embodiment.

FIG. 8 is a diagram illustrating exemplary hardware that controls the picking robot 100 according to an embodiment.

The picking robot 100 includes a processor 301, a main memory device 302, an auxiliary memory device 303, a display device 304, an input device 305, and a communication device 306. The processor 301, the main memory device 302, the auxiliary memory device 303, the display device 304, the input device 305, and the communication device 306 are connected via a bus 310.

The processor 301 executes a program that is read from the auxiliary memory device 303 to the main memory device 302. The main memory device 302 is a memory such as a read only memory (ROM) and a random access memory (RAM). The auxiliary memory device 303 is a hard disk drive (HDD), a solid state drive (SSD), a memory card, or the like.

The display device 304 displays display information. The display device 304 is, for example, a liquid crystal display or the like. The input device 305 is an interface for operating the control device 20. It should be noted that the picking robot 100 does not have to include both or either of the display device 304 and the input device 305.

The communication device 306 is an interface for communicating with other devices. The communication device 306 is used, for example, when control information is input to the grip unit 30. Further, for example, the communication device 306 is used when input information is received from an external device or when display information is transmitted to an external device.

The program to be executed by the computer is provided as a computer program product recorded on a computer-readable storage medium, such as CD-ROM, memory card, CD-R, and digital versatile disc (DVD), in an installable or executable file.

Further, the program to be executed by the computer may be stored in a computer connected to a network such as the Internet and may be configured to be provided by being downloaded via the network. Further, the program to be executed by the computer may be configured to be provided via the network such as the Internet without being downloaded.

Further, the program to be executed by the computer may be configured to be provided in a state of being previously incorporated in a ROM or the like.

The program to be executed by the computer has a module configuration including functional blocks that can be realized by a program among the above-described functional configurations (functional blocks) of the picking robot 100. As the actual hardware, the processor 301 reads the program from the storage medium and executes the program, and each of the functional blocks is loaded onto the main memory device 302. That is, the above-described functional blocks are generated on the main memory device 302.

It should be noted that all or part of the above-described functional blocks are realized by hardware such as an integrated circuit (IC), instead of being realized by software.

Further, when each function is realized using a plurality of processors, each processor may realize one of the respective functions and may realize two or more of the respective functions.

Further, the operation mode of the computer that realizes the control of the picking robot 100 may be arbitrary. For example, in the functional configuration of the picking robot 100, the control device 20 may be realized by a single computer or may be operated as a cloud system on a network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A picking robot comprising:
one or more hardware processors configured to:
acquire first area information indicating a first area in which a target object is placed;
calculate first position and posture information indicating a position and posture of the target object from the first area information;
calculate second position and posture information indicating a position and posture in the first area, the second position and posture information being different from the first position and posture information;
control a first operation of gripping the target object based on the first position and posture information and moving the target object to a second area, determine whether a result of the first operation is inadequate based on a grip state of the target object that is gripped by the first operation, and when the result of the first operation is inadequate, control a second operation of arranging the target object at the position in the first area indicated by the second position and posture information in the posture indicated by the second position and posture information; and a grip mechanism configured to grip the target object and move the gripped target object, based on the control by the one or more hardware processors, wherein:

the one or more hardware processors determine that the result of the first operation is inadequate when the one or more hardware processors are unable to move the target object to the second area in the grip state of the target object gripped by the first operation or when the grip state of the target object gripped by the first operation is unmatched with a grip state indicated by information specified by a grip request that is input to the one or more hardware processors.

2. The picking robot according to claim 1, wherein the position indicated by the second position and posture information is different from the position indicated by the first position and posture information.

3. The picking robot according to claim 2, wherein the position indicated by the second position and posture information indicates a position farther from the position indicated by the first position and posture information.

4. The picking robot according to claim 2, wherein the position indicated by the second position and posture information indicates a position at which a distance between the target object and an obstacle is greater.

5. The picking robot according to claim 1, wherein the posture indicated by the second position and posture information is different from the posture indicated by the first position and posture information.

6. The picking robot according to claim 1, wherein the second position and posture information indicates the position and posture of the target object when the grip mechanism grips the target object again and arranges the target object such that a third operation of moving the target object to the second area is different from the first operation.

7. The picking robot according to claim 6, wherein the second position and posture information indicates the position and posture of the target object when the target object is arranged such that a trajectory of the grip mechanism according to the third operation is different from a trajectory of the grip mechanism according to the first operation.

8. The picking robot according to claim 6, wherein the second position and posture information indicates the position and posture of the target object when the target object is arranged such that the position and posture of the grip mechanism at a point of gripping the target object in the third operation is different from the position and posture of the grip mechanism at a point of gripping the target object in the first operation.

9. The picking robot according to claim 1, wherein the one or more hardware processors are configured to acquire the first area information from a first image indicating the first area information, and the second position and posture information indicates the position and posture of the target object when the target object is arranged such that a second image of the target object arranged based on the second position and posture information is different from the first image.

10. A picking method comprising:

by a picking robot, acquiring first area information indicating a first area in which a target object is placed;

calculating first position and posture information indicating a position and posture of the target object from the first area information;

calculating second position and posture information indicating a position and posture in the first area, the second position and posture information being different from the first position and posture information;

performing controlling that includes controlling of a first operation of gripping the target object based on the first position and posture information and moving the target object to a second area, determining whether a result of the first operation is inadequate based on a grip state of the target object that is gripped by the first operation, and when the result of the first operation is inadequate, controlling of a second operation of arranging the target object at the position in the first area indicated by the second position and posture information in the posture indicated by the second position and posture information; and gripping the target object and moving the gripped target object, based on the controlling performed by the picking robot, wherein:

the controlling includes determining that the result of the first operation is inadequate when the target object cannot be moved to the second area in the grip state of the target object gripped by the first operation or when the grip state of the target object gripped by the first operation is unmatched with a grip state indicated by information specified by a grip request that is input to the picking robot.

11. A non-transitory computer readable medium having stored thereon a computer program including instructions that are executable by a computer to cause the computer to perform functions comprising:

acquiring first area information indicating a first area in which a target object is placed;

calculating first position and posture information indicating a position and posture of the target object from the first area information;

calculating second position and posture information indicating a position and posture in the first area, the second position and posture information being different from the first position and posture information;

controlling a grip mechanism to perform a first operation of gripping the target object based on the first position and posture information and moving the target object to a second area, determining whether a result of the first operation is inadequate based on a grip state of the target object that is gripped by the first operation, and when the result of the first operation is inadequate, controlling the grip mechanism to perform a second operation of arranging the gripped target object at the position in the first area indicated by the second position and posture information in the posture indicated by the second position and posture information, wherein:

the controlling includes determining that the result of the first operation is inadequate when the target object cannot be moved to the second area in the grip state of the target object gripped by the first operation or when the grip state of the target object gripped by the first operation is unmatched with a grip state indicated by information specified by a grip request that is input to the computer.

\* \* \* \* \*